(12) United States Patent
Chen

(10) Patent No.: US 9,400,080 B2
(45) Date of Patent: Jul. 26, 2016

(54) AUTOMATIC RISE JACK STAND

(71) Applicant: Victor Hung, Taipei (TW)

(72) Inventor: Kevin Chen, Taipei (TW)

(73) Assignee: Victor Hung, Taipei (TW)

( * ) Notice: Subject to any disclaimer, the term of this patent is extended or adjusted under 35 U.S.C. 154(b) by 83 days.

(21) Appl. No.: 14/332,139

(22) Filed: Jul. 15, 2014

(65) Prior Publication Data

US 2015/0308612 A1    Oct. 29, 2015

(30) Foreign Application Priority Data

Apr. 28, 2014    (CN) .................... 2014 2 0210385 U
Apr. 30, 2014    (TW) ............................ 103207527 A

(51) Int. Cl.
| | | |
|---|---|---|
| A47F 5/00 | (2006.01) |
| E04G 25/00 | (2006.01) |
| F16M 13/00 | (2006.01) |
| F16M 11/28 | (2006.01) |
| F16M 11/18 | (2006.01) |

(Continued)

(52) U.S. Cl.
CPC .................. *F16M 11/28* (2013.01); *B66F 3/25* (2013.01); *F16M 11/18* (2013.01); *F16M 11/22* (2013.01); *B66F 1/00* (2013.01); *B66F 1/06* (2013.01); *B66F 1/08* (2013.01); *B66F 3/00* (2013.01); *B66F 5/00* (2013.01); *F16M 11/04* (2013.01); *F16M 11/046* (2013.01)

(58) Field of Classification Search
CPC ....... F16M 11/04; F16M 11/24; F16M 11/28; F16M 11/046; A47C 3/30; A47C 3/28; B66F 5/00; B66F 1/06; B66F 1/025; B66F 1/04; B66F 3/00; B66F 3/24; B66F 7/18; B66F 1/00; B66F 3/10

USPC ............. 248/162.1, 407, 411, 423, 351, 352, 248/354.1, 354.3, 354.4, 354.6; 254/93 H, 254/105, 2 B, 93 R, 133 R, 134, 100, 108, 254/110, 112, 423; 411/347, 348

See application file for complete search history.

(56) References Cited

U.S. PATENT DOCUMENTS

| 486,822 | A | * | 11/1892 | Chandler | ...................... 248/407 |
| 780,979 | A | * | 1/1905 | Correll | ................... B66F 3/247 |
| | | | | | 248/354.7 |

(Continued)

OTHER PUBLICATIONS

U.S. Appl. No. 29/496,647 Notice of Allowance issued Apr. 10, 2015, 12 pages.

*Primary Examiner* — Brian Mattei
*Assistant Examiner* — Taylor Morris
(74) *Attorney, Agent, or Firm* — Lathrop & Gage LLP

(57) ABSTRACT

One jack stand includes a stand assembly having a base and a tubular receiving member extending upwardly therefrom. A latch extends from the tubular member. A support bar having upper and lower ends is telescopically housed in a cavity of the tubular member. First and second sides of the bar each have multiple embedded slots. A third side of the bar has multiple holes with angled surfaces such that positioning the latch in any of the holes restricts the bar from moving upwardly yet allows the bar to move downwardly. An automatic lifting device is at least partially inside the cavity and imparts an upward force upon the bar. A stopper selectively interacts with the stand assembly and the bar to restrict the bar from moving downwardly, yet allows the bar to move upwardly. The stopper passes at least partially inside two of the slots to interact with the bar.

7 Claims, 6 Drawing Sheets

(51) Int. Cl.

| | | |
|---|---|---|
| *F16M 11/22* | (2006.01) | |
| *B66F 3/25* | (2006.01) | |
| *F16M 11/00* | (2006.01) | |
| *B66F 3/24* | (2006.01) | |
| *B66F 3/42* | (2006.01) | |
| *B66F 1/00* | (2006.01) | |
| *B66F 1/04* | (2006.01) | |
| *B66F 3/00* | (2006.01) | |
| *B60S 9/02* | (2006.01) | |
| *F16M 11/04* | (2006.01) | |
| *B66F 5/00* | (2006.01) | |
| *B66F 1/06* | (2006.01) | |
| *B66F 1/08* | (2006.01) | |

(56) References Cited

U.S. PATENT DOCUMENTS

| | | | |
|---|---|---|---|
| 1,661,882 A | 3/1928 | Derrick | |
| 3,165,295 A * | 1/1965 | Nolden | 254/2 R |
| D230,014 S | 1/1974 | Edgell, Sr. | |
| 3,802,658 A | 4/1974 | Binding | |
| D269,473 S | 6/1983 | Jonsson | |
| 4,602,890 A * | 7/1986 | Duda | 403/105 |
| 4,690,361 A | 9/1987 | Lundman | |
| 4,759,671 A * | 7/1988 | Duran | 411/347 |
| 5,180,131 A | 1/1993 | Few | |
| 5,379,974 A * | 1/1995 | Slay et al. | 248/161 |
| 5,873,312 A * | 2/1999 | Mauro-Vetter | 108/147.21 |
| 5,988,963 A * | 11/1999 | Shiau | 410/151 |
| 6,053,477 A | 4/2000 | Price | |
| 6,241,204 B1 * | 6/2001 | Bermes | 248/210 |
| 6,443,413 B1 * | 9/2002 | Hawkins et al. | 248/352 |
| 6,902,148 B1 * | 6/2005 | Spencer | 254/93 H |
| D513,819 S | 1/2006 | Ji | |
| D537,605 S | 2/2007 | Rivera | |
| 7,441,733 B2 * | 10/2008 | Chen et al. | 248/125.8 |
| D621,122 S | 8/2010 | Finkbeiner | |
| D656,289 S | 3/2012 | Crump | |
| 2005/0104050 A1 | 5/2005 | Spencer | |
| 2008/0203265 A1 | 8/2008 | Zhang | |
| 2010/0258775 A1 * | 10/2010 | Zhengwei | 254/93 H |

* cited by examiner

AUTOMATIC RISE JACK STAND

RELATED APPLICATIONS

This application claims priority to Taiwanese patent application 103207527 filed Apr. 30, 2014 and titled "Self Rising U Style Jack Stand," and to Chinese patent application 201420210385 filed Apr. 28, 2014 and titled "Self Rising U Style Jack Stand." The disclosures of each are incorporated herein in their entirety by reference.

BACKGROUND

Prior art jack stands typically include a base, a support bar, and a stopper. In use, the support bar is inserted and moved in the base internally. Once manually adjusted to the desired work position, the support bar is locked with the stopper. An example prior art device is disclosed in U.S. Pat. No. 3,802,658. There, column 10 provides the base, post 14 provides the support bar, and pin 54 is the stopper. However, such conventional jack stands cannot be rapidly, automatically raised to the working position while under no load.

Embodiments of the current invention advance the jack stand art.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere.

In one embodiment, a jack stand includes a stand assembly, a latch, a support bar, an automatic lifting device, and a stopper for selectively interacting with the stand assembly and the support bar to restrict the support bar from moving downwardly yet allow the support bar to move upwardly. The stand assembly has a base and a tubular receiving member extending upwardly from the base. The tubular member defines a cavity. The latch extends from the tubular receiving member. The support bar has upper and lower ends and is telescopically housed in the tubular member cavity. The support bar further has first, second, and third sides. The first and second support bar sides each have multiple embedded slots, and the third support bar side has multiple holes. The support bar holes have angled surfaces such that positioning of the latch in any of the support bar holes restricts the support bar from moving upwardly yet allows the support bar to move downwardly. The automatic lifting device is disposed at least partially inside the tubular member cavity, and the automatic lifting device imparts an upward force upon the support bar. The stopper passes at least partially inside two of the embedded slots to interact with the support bar.

DETAILED DESCRIPTION

Figure 1:
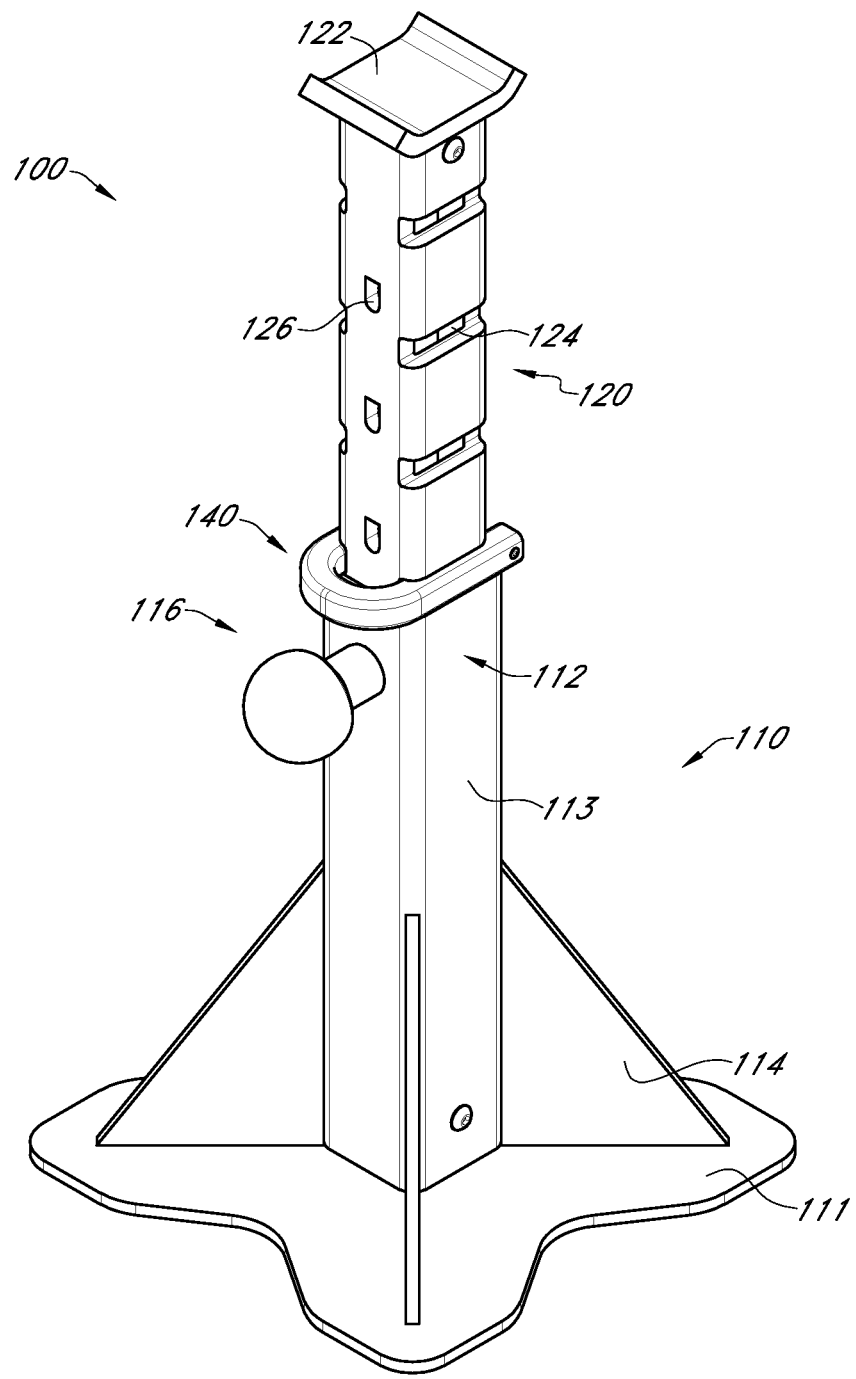
FIG. 1 is a perspective view of a jack stand according to one embodiment of the current invention.
Figure 2:
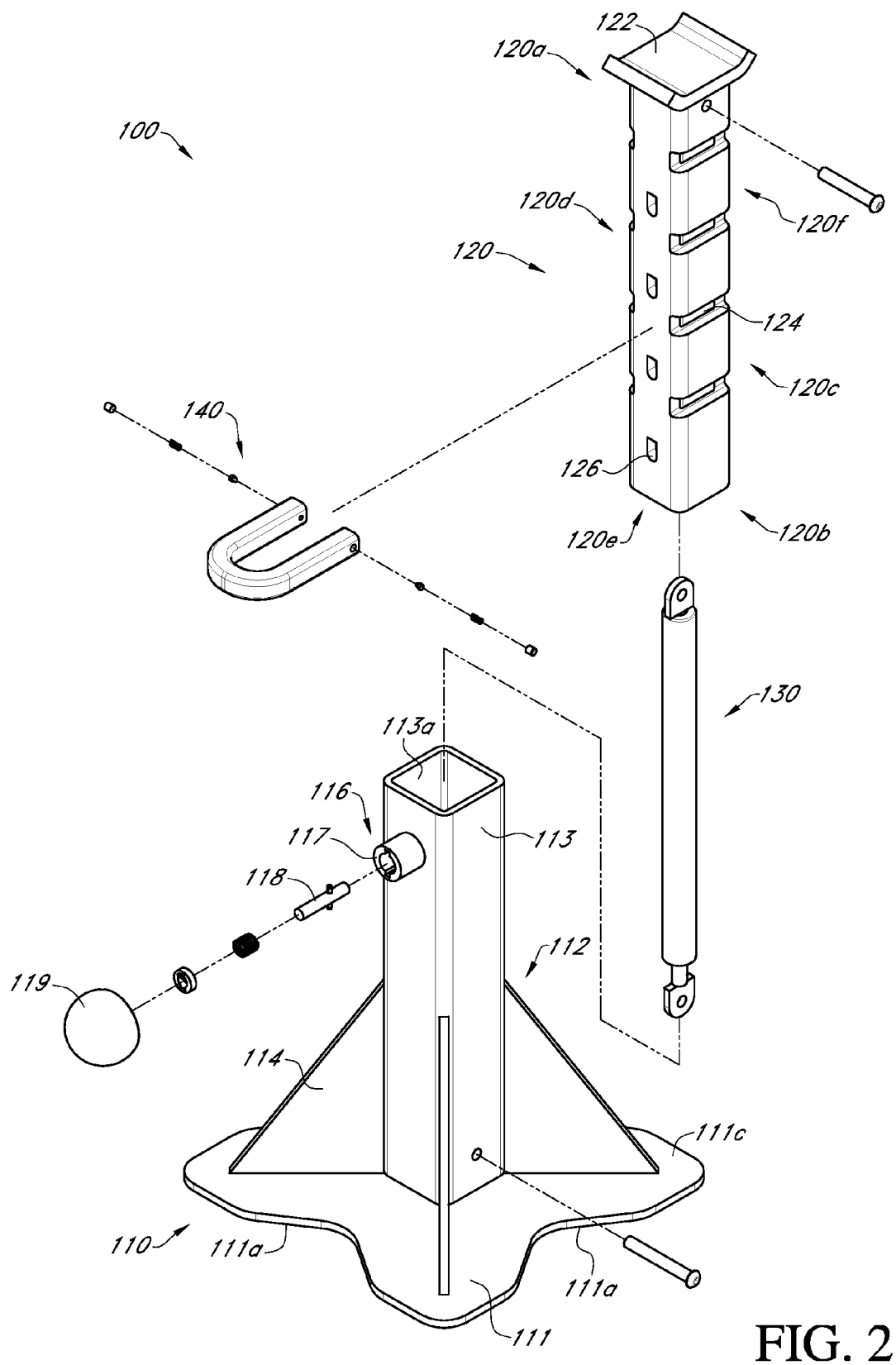
FIG. 2 is an exploded view of the jack stand of FIG. 1.

FIGS. 1 through 8 show a jack stand according to one embodiment 100 of the current invention. Reference numbers used to describe and illustrate the jack stand 100 are independent from and used without respect to the reference numbers appearing in the Background section above.

The jack stand 100 includes a stand assembly 110, a support bar 120, a pneumatic lift 130, and a stopper 140. With focus on FIGS. 1 through 4, the stand assembly 110 includes a base 111, a receiving member 112 extending upwardly from the base 111, and a latching portion 116 installed on one side of the receiving member 112. The base 111 may be generally square, circular, or another appropriate shape. The base 111 shown in the accompanying figures includes inwardly-extending regions 111a for aesthetic purposes and has generally flat upper and lower surfaces 111c, 111d. In some embodiments, it may be desirable for the upper surface 111c and/or the lower surface 111d to include texture, such as for aesthetic or functional (e.g., non-slip) purposes.

The receiving member 112 includes an upwardly-extending tubular member 113 which defines a cavity 113a, and supports 114 further stabilize the tubular member 113 relative to the base 111. The tubular member 113 and the supports 114 may be formed unitary with each other and/or the base 111, or may be coupled together through any appropriate fastening methods (for example, welding or adhesive).

The latching portion 116 includes a sleeve 117 extending from the tubular member 113, a movable latch 118, and a locking knob 119 extending from the latch 118. The latch 118 is particularly movable from an inserted position 118a (FIG. 5, discussed in more detail below) in which at least a portion of the latch 118 enters the cavity 113a and interacts with the support bar 120, and a retracted position 118b (FIG. 6, discussed in more detail below) in which the latch 118 is retracted from the cavity 113a and does not interact with the support bar 120.

The support bar 120 has upper and lower ends 120a, 120b and is telescopically housed in the tubular member cavity 113a, such that the lower end 120b typically does not separate from the tubular member 113. A saddle 122 may be formed with (or coupled to) the support bar upper end 120a. Numerous saddles are well known in the art, and any of the various saddles (whether now known or later developed) may be used. Two opposed sides 120c, 120d of the support bar 120 each include multiple embedded slots 124, and at least one of the remaining sides 120e, 120f of the support bar 120 includes multiple holes 126. It may be desirable for the slots 124 on the sides 120c, 120d to be generally mirror images of one another about an imaginary vertical axis of the support bar 120, and for the holes 126 to be vertically offset relative to the slots 124.

Figure 5:
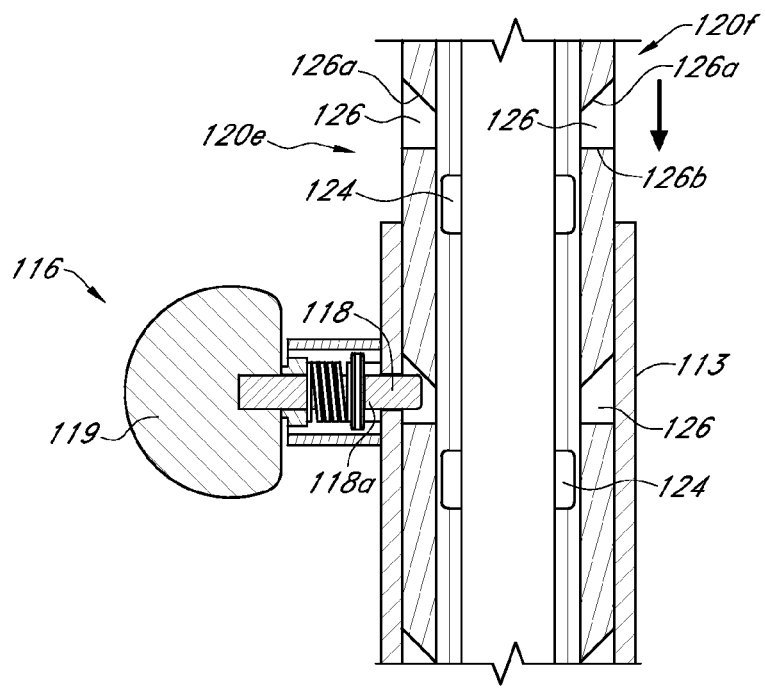
FIG. 5 is a section view of a latch of the jack stand of FIG. 1, at an inserted configuration.
Figure 6:
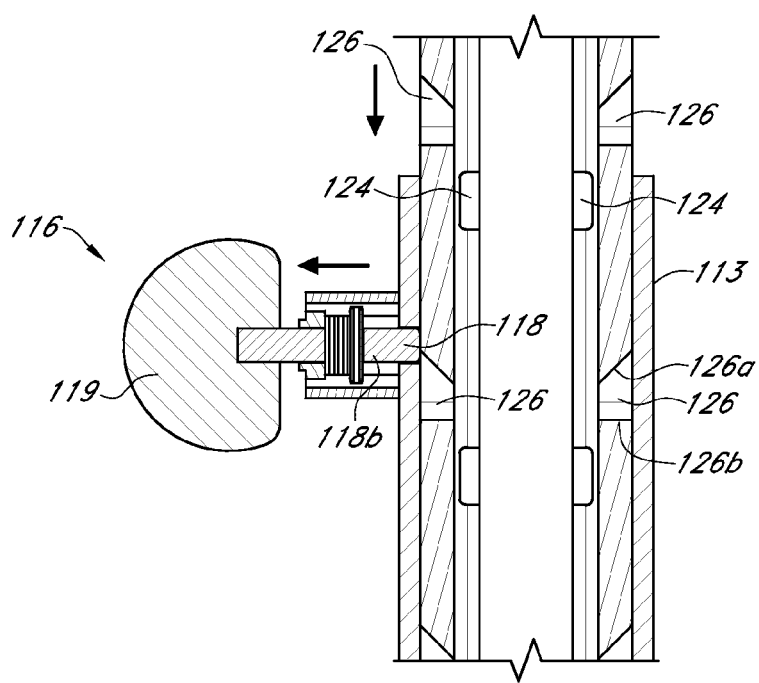
FIG. 6 is a section view of the latch of the jack stand of FIG. 1, at a retracted configuration.

As shown in FIGS. 5 and 6, an upper wall 126a of each hole 126 may form an obtuse angle with a face of the respective side 120e, 120f, and a lower wall 126b of each hole 126 may be generally perpendicular with the face of the respective side 120e, 120f. The holes 126 and the latch 118 are collectively configured such that the latch 118 may pass into the respectively holes 126 when at the inserted position 118a, whereby restricting the support bar 120 from being undesirably moving upwardly by the pneumatic lift 130.

Figure 3:
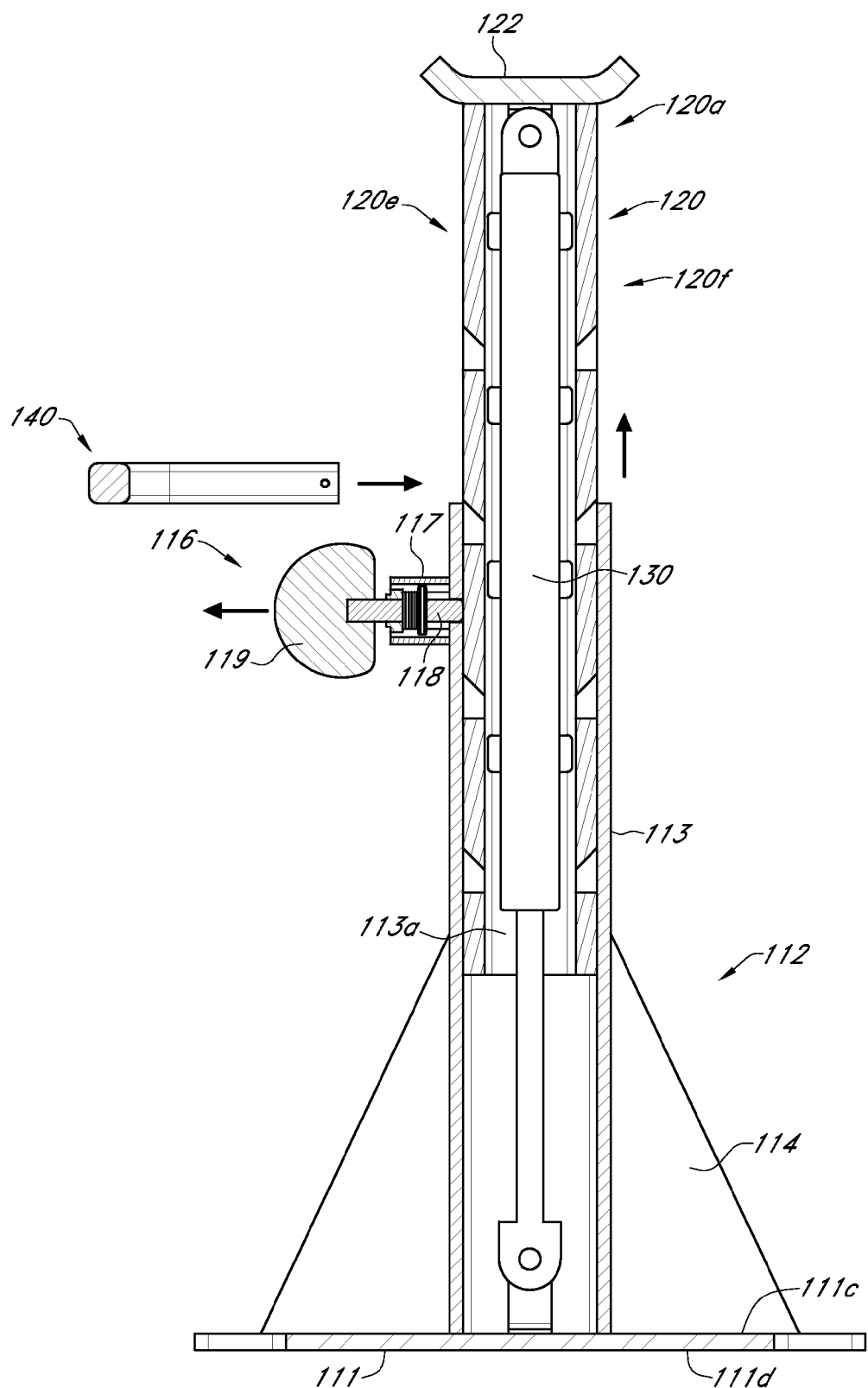
FIG. 3 is a section view of the jack stand of FIG. 1.
Figure 4:
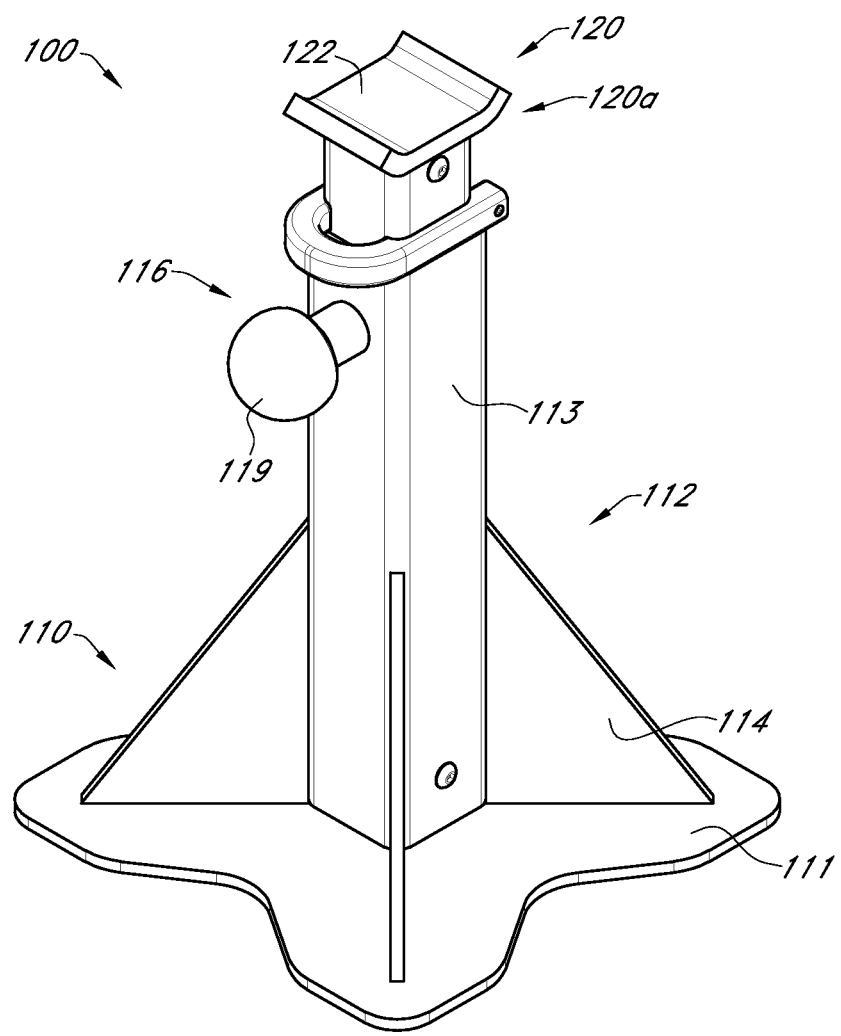
FIG. 4 is another perspective view of the jack stand of FIG. 1, at a lowered configuration.

The pneumatic lift 130 may be any appropriate pneumatic lifting device, whether now known or later developed, that is biased to an extended configuration and returns to the extended configuration when compressed. As best shown in FIG. 3, an upper end 130a of the pneumatic lift 130 may be coupled to the support bar 120, and a lower end 130b of the pneumatic lift 130 may be coupled to the stand assembly 110. Enclosing the pneumatic lift 130 inside the tubular member 113 and the support bar 120 may be particularly desirable.

Turning now to the stopper 140, the stopper 140 may be used to prevent the support bar 120 from undesirably lowering (e.g., under the force of an external load such as a vehicle). The stopper 140 is configured to interact with both the support bar 120 and the stand assembly 110, for example by passing at least partially inside respective embedded slots 124 and resting atop the receiving member 112. It may be particularly desirable for the stopper 140 to simultaneously pass through multiple (e.g., two) of the embedded slots 124. As shown throughout the drawings, the stopper 140 may be aesthetically configured to have a horseshoe shape, or may have any other appropriate aesthetic configuration.

Figure 7:
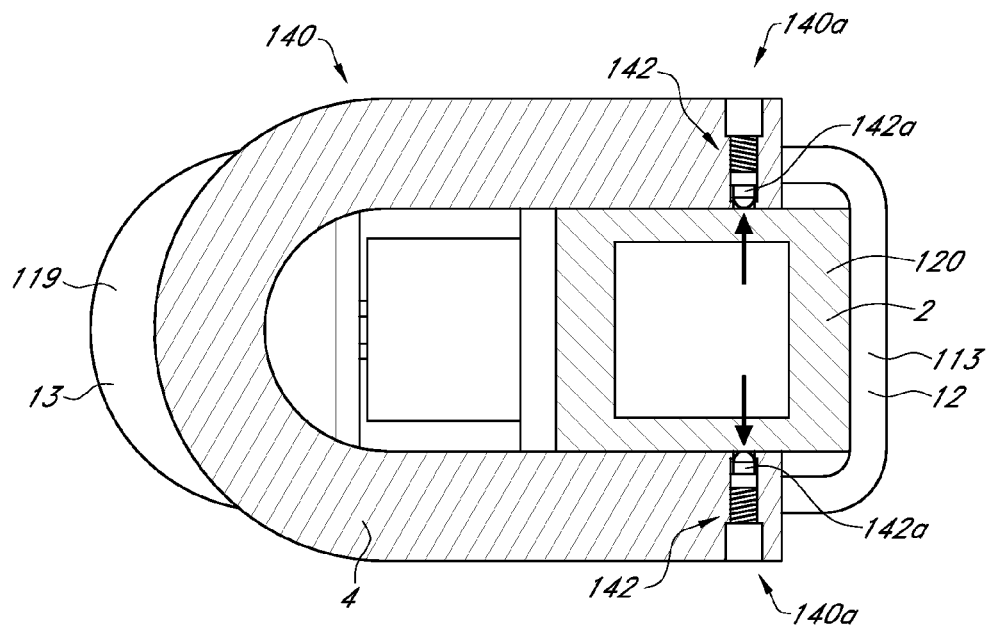
FIG. 7 is a section view of a stopper of the jack stand of FIG. 1, with spring-loaded ball bearings at a retracted configuration.
Figure 8:
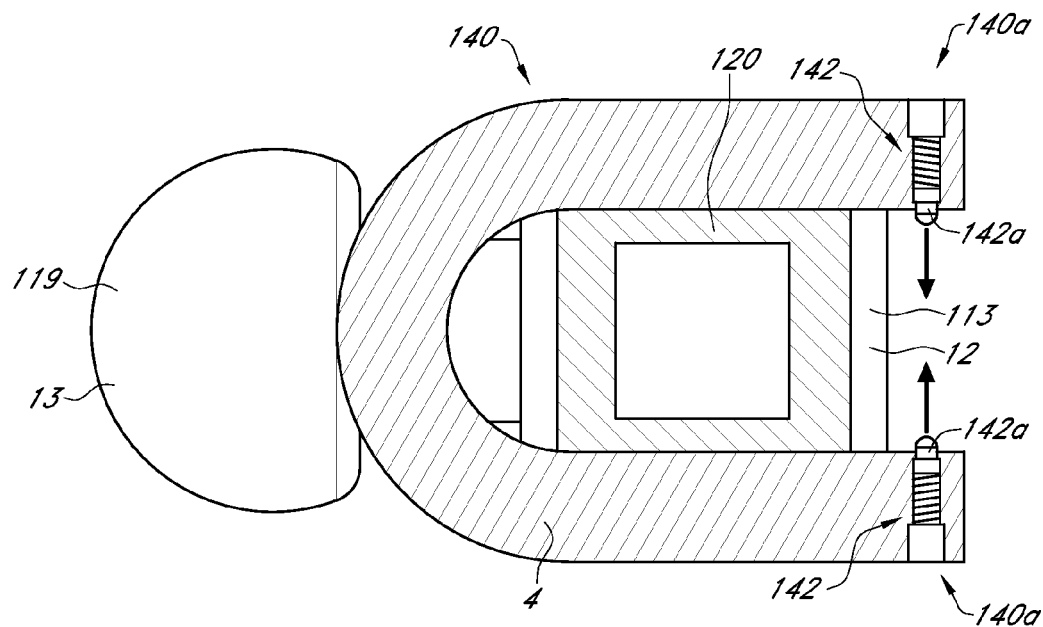
FIG. 8 is a section view of the stopper of the jack stand of FIG. 1, with the spring-loaded ball bearings at an extended configuration.

At least one locking device 142 may be included to prevent the stopper 140 from being undesirably separated from the support bar 120. For example, as shown in FIGS. 7 and 8, spring-loaded ball bearings 142a may be located at a distal end 140a of the stopper, such that the spring-loaded ball bearings 142a automatically extend (FIG. 8) when not in contact with the support bar 120 and must be retracted (FIG. 7) to move along the support bar 120. The amount of force necessary to retract the spring-loaded ball bearings 142a may be adjusted, for example, through use of springs having different properties. And while helical springs are shown in FIGS. 7 and 8, those skilled in the art will appreciate that other springs may alternately (or additionally) be incorporated, such as flat springs, pneumatic springs, and magnetic springs.

In use, the jack stand 100 may start at a lowered, assembled configuration (FIG. 4) and may be placed beneath an item (e.g., a vehicle) that is to be supported. The locking knob 119 may then be pulled, which in turn moves the latch 118 from the inserted position 118a (FIG. 5) to the retracted position 118b (FIG. 6). With the latch 118 at the retracted position 118b, the pneumatic lift 130 automatically raises the support bar 120. Once the support bar 120 is at the desired height, the locking knob 119 is released, returning the latch 118 to the inserted position 118a.

At any point before the item to be supported is supported by the jack stand 100, the stopper 140 may be removed by pushing or pulling the stopper 140 with sufficient force to retract the spring-loaded ball bearings 142a, and may be relocated to interact with the lowest exposed embedded slots 124 (FIG. 1) by pushing or pulling the stopper 140 with sufficient force to retract the spring-loaded ball bearings 142a until the spring-loaded ball bearings 142a are past the support bar 120. Once the spring-loaded ball bearings 142a are past the support bar 120, they may return to the extended configuration as shown in FIG. 8. With the stopper 140 properly positioned along the support bar 120 and resting atop the tubular member 113, the saddle 122 may receive the item to be supported and the stopper 140 may prevent the support bar 120 from lowering.

To lower the support bar 120, it may be desirable to first remove any load on the saddle 122. Then the stopper 140 is removed by pushing or pulling the stopper 140 with sufficient force to retract the spring-loaded ball bearings 142a. With the stopper 140 removed, the force from the pneumatic lift 130 may be overcome manually (e.g., by pressing downward with one's hands) to lower the support bar 120, and the angled upper walls 126a of the holes 126 may force the latch 118 to the retracted position 118b when not in the holes 126. When in a respective hole 126, the latch 118 automatically returns to the inserted position 118a and prevents the support bar 120 from rising. Once the support bar 120 is at the desired position, the stopper 140 may be reattached.

Thus, it should be clear that the latch 118 is used to prevent the support bar 120 from undesirably moving upwardly (but does not restrict the support bar 120 from moving downwardly), and the stopper 140 is used to prevent the support bar 120 from undesirably moving downwardly (but does not restrict the support bar 120 from moving upwardly).

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention. It will be understood that certain features and subcombinations are of utility and may be employed without reference to other features and subcombinations and are contemplated within the scope of the claims. Various steps in described methods may be undertaken simultaneously or in other orders than specifically provided.

The invention claimed is:

1. A jack stand, comprising:
    a stand assembly having a base and a tubular receiving member extending upwardly from the base, the tubular member defining a cavity;
    a latch extending from the tubular receiving member;
    a support bar having upper and lower ends and being telescopically housed in the tubular member cavity; the support bar having first, second, and third sides; the first and second support bar sides each having multiple embedded slots; the third support bar side having multiple holes; the support bar holes having angled surfaces such that positioning of the latch in any of the support bar holes restricts the support bar from moving upwardly yet allows the support bar to move downwardly;
    an automatic lifting device disposed at least partially inside the tubular member cavity, the automatic lifting device continuously imparting an upward force upon the support bar;
    a stopper for selectively interacting with the stand assembly and the support bar to restrict the support bar from moving downwardly yet allow the support bar to move upwardly, the stopper passing at least partially inside two of the embedded slots to interact with the support bar; and
    a locking device preventing the stopper from being undesirably separated from the support bar
    wherein:
        the stopper rests atop the tubular receiving member to interact with the stand assembly;
        the support bar first side is opposite and generally parallel to the support bar second side;
        the support bar holes are vertically offset relative to the support bar slots; and
        the locking device includes a spring-loaded ball bearing at a distal end of the stopper.

2. The jack stand of claim 1, further comprising a saddle at the support bar upper end.

3. The jack stand of claim 2, wherein the automatic lifting device is a pneumatic lifting device.

4. The jack stand of claim 3, wherein the pneumatic lifting device extends at least partially inside the support bar.

5. The jack stand of claim 4, wherein the stopper is U-shaped.

6. A jack stand, comprising:
   a stand assembly having a base and a tubular receiving member extending upwardly from the base, the tubular member defining a cavity;
   a latch extending from the tubular receiving member;
   a support bar having upper and lower ends and being telescopically housed in the tubular member cavity; the support bar having first, second, and third sides; the first and second support bar sides each having multiple embedded slots; the third support bar side having multiple holes; the support bar holes having angled surfaces such that positioning of the latch in any of the support bar holes restricts the support bar from moving upwardly yet allows the support bar to move downwardly;
   an automatic lifting device disposed at least partially inside the tubular member cavity, the automatic lifting device continuously imparting an upward force upon the support bar;
   a stopper for selectively interacting with the stand assembly and the support bar to restrict the support bar from moving downwardly yet allow the support bar to move upwardly, the stopper passing at least partially inside two of the embedded slots to interact with the support bar; and
   a locking device at a distal end of the stopper, the locking device preventing the stopper from being undesirably separated from the support bar and including a spring-loaded ball bearing.

7. The jack stand of claim 6, wherein the spring-loaded ball bearing includes at least one item selected from the group consisting of: a helical spring, a flat spring, a pneumatic spring, and a magnetic spring.

\* \* \* \* \*